No. 648,263. Patented Apr. 24, 1900.
F. B. HULL.
PORTABLE SPRINKLER.
(Application filed Sept. 14, 1899.)
(No Model.) 2 Sheets—Sheet 1.
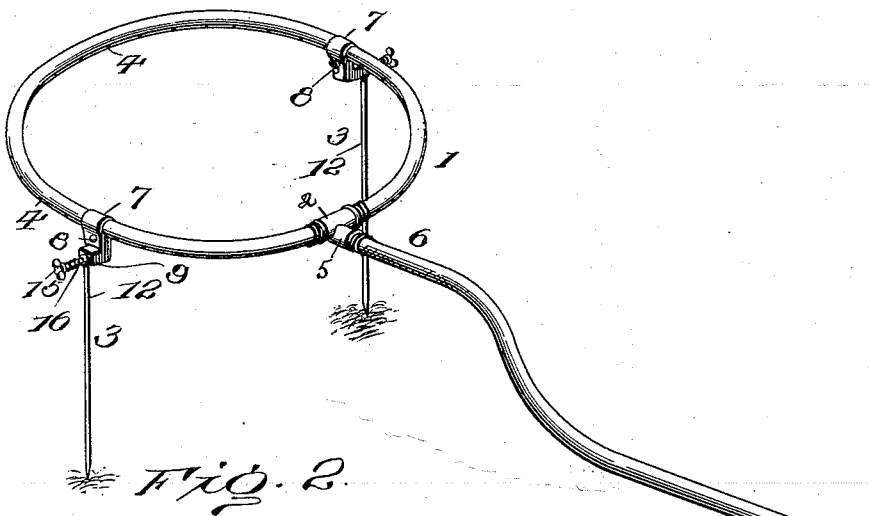
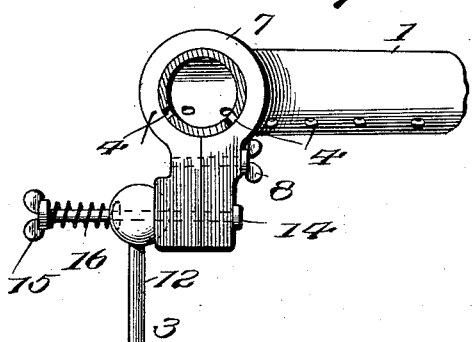
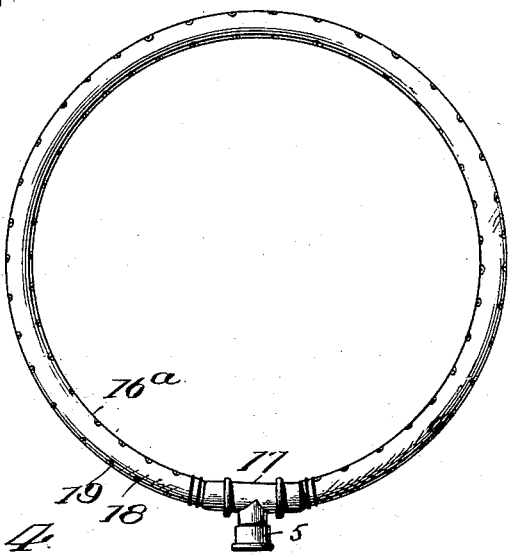
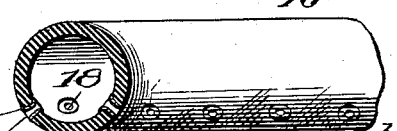
Witnesses
Inventor
Franc B. Hull
by R. S. & A. B. Lacey
her Attorneys
THE NORRIS PETERS CO., PHOTO-LITHO., WASHINGTON, D. C.

No. 648,263. Patented Apr. 24, 1900.
F. B. HULL.
PORTABLE SPRINKLER.
(Application filed Sept. 14, 1899.)
(No Model.) 2 Sheets—Sheet 2.
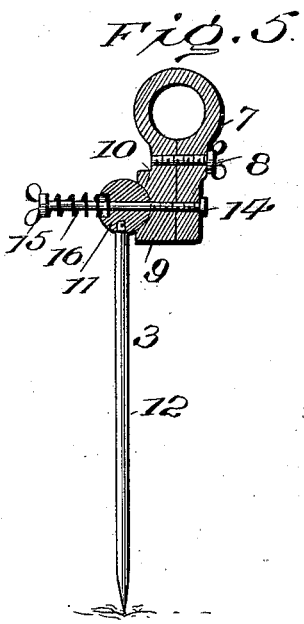
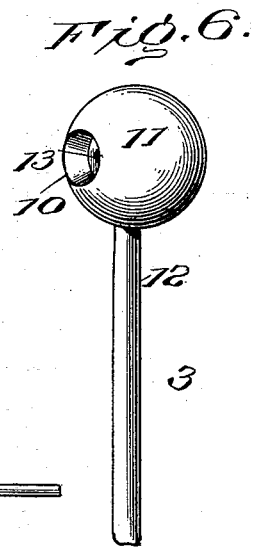
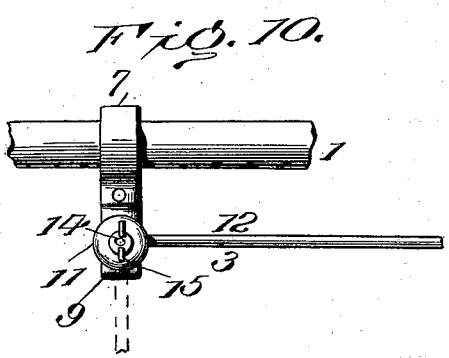
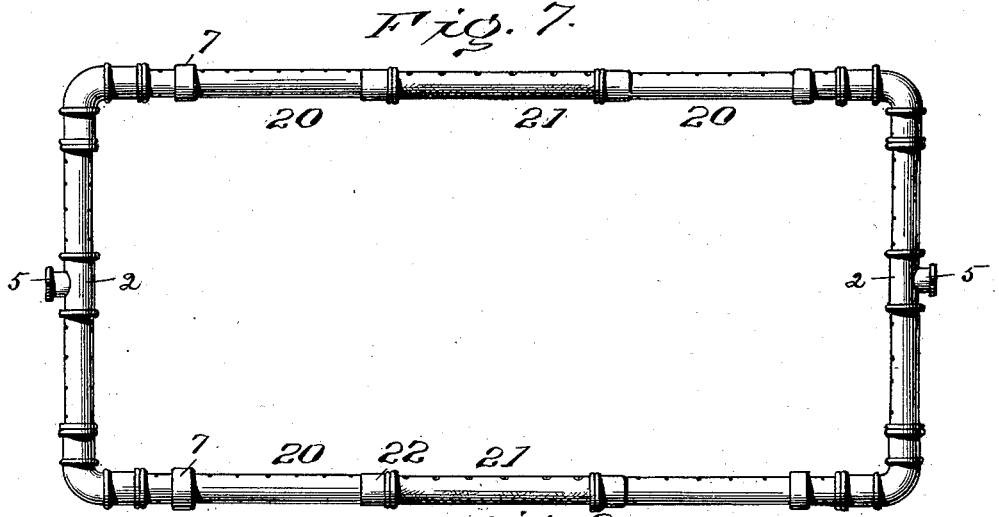
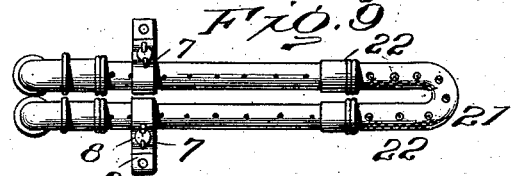
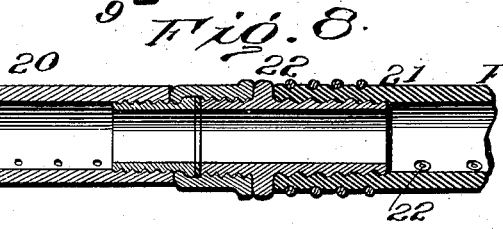
Witnesses Inventor
Franc B. Hull
by R. S. & A. B. Lacey
her Attorneys
THE NORRIS PETERS CO., PHOTO-LITHO., WASHINGTON, D. C.

UNITED STATES PATENT OFFICE.

FRANC B. HULL, OF OSKALOOSA, IOWA.

PORTABLE SPRINKLER.

SPECIFICATION forming part of Letters Patent No. 648,263, dated April 24, 1900.

Application filed September 14, 1899. Serial No. 730,495. (No model.)

*To all whom it may concern:*

Be it known that I, FRANC BARNES HULL, a citizen of the United States, residing at Oskaloosa, in the county of Mahaska and State of Iowa, have invented certain new and useful Improvements in Portable Sprinklers; and I do hereby declare the following to be a full, clear, and exact description of the invention, such as will enable others skilled in the art to which it appertains to make and use the same.

This invention relates to improvements in devices for sprinkling lawns, terraces, &c.; and one object is to provide a sprinkler in the form of a perforated pipe bent into the desired shape or of a series of perforated pipe-sections flexibly connected, so as to be extended in a straight or curved line or arranged to inclose or partially inclose the area to be sprinkled, said sprinkler adapted to be readily and conveniently put up and taken down and effectually supported without marring the appearance of the lawn or terrace.

A further object of the invention is to provide a sprinkler wherein the parts are designed to be folded in close compass for storage, transportation, and convenience in handling and which shall be simple, cheap, and effective in construction and operation.

With these and other minor objects in view the invention consists of certain novel features of construction, combination, and arrangement of parts, which will be hereinafter more fully described, and particularly pointed out in the appended claims.

In the accompanying drawings, forming a part of this specification, and in which like reference-numerals designate corresponding parts throughout the several views, Figure 1 is a perspective view of one form of my invention, showing its manner of use. Fig. 2 is a cross-section of the same. Fig. 3 is a top plan view showing a modification. Fig. 4 is a cross-section thereof. Figs. 5 and 6 are detail views showing the construction of the split collar and folding leg. Fig. 7 is a top plan view showing a further modification. Fig. 8 is a longitudinal section through the connecting ends of the rigid and flexible pipe-sections thereof. Fig. 9 is a plan view illustrating the manner of folding the sections on one another. Fig. 10 is a side view of one of the metallic pipe-sections, showing the supporting-leg folded up.

In the embodiment of my invention disclosed in Figs. 1 and 2 the sprinkler consists of a metallic pipe 1 of circular, oval, or any other desired geometrical form and having its ends united by a suitable coupling 2. This pipe is adapted to be supported by legs 3 of the construction hereinafter described and is provided around its inner and outer circumferences with one or more series of perforations or openings 4, forming outlets, through which the water is adapted to pass in the form of mist or spray. A nipple 5 is provided at a suitable point along said pipe to receive the end of a hose 6, leading from a suitable source of water-supply, and whereby the water is conducted to the pipe for emission through said apertures or jet-openings. This nipple may be formed upon the coupling, as shown, or applied directly to the pipe. The legs 3 are adapted to be forced into the ground to support the sprinkler and are also adapted to be folded up against the under side of the pipe, so that the latter may be quickly put up and taken down and be easily handled. Each leg comprises in its construction a split collar or band 7, embracing the pipe and having a bolt or nut applied to the ends 8 thereof to draw said ends together, and thereby adjustably connect the collar to the pipe. One of the legs or extremities of the collar is longer than the other and terminates in a boss 9, provided in its outer face with a recess or socket 10 for the reception of a circular or rounding head 11, formed upon the upper end of the leg 12. This head is provided in its outer side or face with a recess or opening 13 and is pivotally connected with the said boss by means of a bolt 14, passing therethrough and through the boss and provided at one end thereof with a wing-nut 15. A spiral spring 16 encompasses the bolt between the head of the leg and wing-nut and projects into the said recess 10, which constitutes a partial housing therefor, and the spring normally tends to force the head 11 of the leg in frictional engagement with the boss, so as to hold the leg firmly against casual displacement. By tightening or loosening up the wing-nut 15 the tension of the spring may be regulated as desired, so as to cause the head to move with greater or less freedom on the pivot-bolt, thereby holding it against movement or adapting it to be conveniently moved in one direction or the other to bring it in operative position or fold it up against the pipe.

In using the form of sprinkler above described the pipe is placed in a horizontal position and the legs are forced into the ground to retain it in such position. The hose or other suitable water-conductor 6 is then applied to the nipple 5, and the water passing through the pipe discharges through the jet-openings 4 in form of spray, the arrangement of the openings upon the inner and outer circumferences of the pipe serving to effectually distribute the spray throughout a wide area. If desired, a single row of openings or jets may alone be employed; but the arrangement shown is preferred, as it permits the sprinkler to be used for spraying a lawn and terrace separately or simultaneously by placing the sprinkler at the crown of the terrace, as will be readily understood. The sprinkler may be readily taken down for storage by folding up the legs against the under side of the pipe in the manner described, whereupon the pipe may be easily handled.

In the construction shown in Figs. 3 and 4 the sprinkler 16ª is formed substantially the same as the sprinkler shown in Figs. 1 and 2, but is composed of a piece of hose bent into the form shown and having its ends connected by the hose-coupling 17 of ordinary construction. The perforations, openings, or jet-orifices 18 are arranged in the same manner as those shown in the first-mentioned construction, but are reinforced by eyelets 19, which stiffen the walls of said openings and prevent the same from tearing under strain. In practice this form of sprinkler when in use may have its ends disconnected by disengaging the coupling, so that it may be straightened out and stored away in a more convenient manner.

Figs. 7 to 10, inclusive, show a further modified form of sprinkler composed of alternate rigid and flexible sections coupled together, so that they may be arranged in any desired geometrical form to extend in a straight or curved line or inclose or partially inclose the lawn, terrace, or other ground to be sprinkled.

The rigid pipe-sections 20, which may be of gas-pipe or other suitable rigid material, and the flexible pipe-sections 21, preferably composed of hose-piping, are connected by couplings 22 of any preferred construction, and the hose-sections serve as flexible connections, whereby the sprinkler may be arranged in any desired geometrical form and said sections folded upon one another in the manner shown in Fig. 10, so that the sprinkler may be packed in close compass for storage or transportation. The legs 3 are provided in this instance upon each metallic pipe-section and the flexible hose-sections have their jet-orifices reinforced by eyelets 22 to stiffen them without impairing the flexibility of said sections. By this means a series of sprays or jets of water may be attained at proper intervals along the entire length of the sprinkler and the hose-pipe sections also utilized as flexible connections, whereby the rigid pipe-sections may be folded in the manner described or arranged to extend in any desired angle to suit the ground to be sprinkled. The operation of this form of sprinkler will be readily understood from the foregoing description.

Changes in the form, proportion, and minor details of construction may be made within the scope of the invention without departing from the spirit or sacrificing any of the advantages thereof.

Having thus described the invention, what is claimed as new is—

1. A portable sprinkler, comprising a perforated pipe having a nipple for the attachment of a water-conductor, and legs adjustably applied to said pipe and adapted when not in use to fold against the same.

2. A portable sprinkling device, comprising a perforated pipe having supporting-legs attached thereto, each of said legs comprising a collar embracing the pipe and having a socket or recess, a leg having a head entering said recess, a pivot-bolt uniting the collar and head, an adjusting-nut on said bolt, and a spring on the bolt between the nut and head.

3. A portable sprinkler, comprising a series of perforated metallic pipe-sections, a series of perforated hose-pipe sections flexibly connecting the metallic pipe-sections, and foldable legs applied to some of said sections for supporting the sprinkler.

In testimony whereof I affix my signature in presence of two witnesses.

FRANC B. HULL. [L. S.]

Witnesses:
SCOTT H. HULL,
MARGARET WRIGHT.